United States Patent [19]

Giorgio et al.

[11] Patent Number: 4,793,878
[45] Date of Patent: Dec. 27, 1988

[54] METHOD AND DEVICE FOR AUTOMATIC ASSEMBLY OF LAMINATED PANES

[75] Inventors: Guglielmetti Giorgio, Mondovi; Carosslo Guido, Turin; Gilli Luigi, Luserna S. Giovanni, all of Italy

[73] Assignee: Saint-Gobain Vitrage, Courbevoie, France

[21] Appl. No.: 19,758

[22] Filed: Feb. 27, 1987

[30] Foreign Application Priority Data

Feb. 27, 1986 [FR] France .................. 86 02711

[51] Int. Cl.[4] ............................. B32B 17/04
[52] U.S. Cl. ........................ 156/64; 156/99; 156/102; 156/106; 156/351; 156/364; 156/556
[58] Field of Search ............. 156/364, 107, 109, 102, 156/556, 363, 387, 99, 64

[56] References Cited

U.S. PATENT DOCUMENTS 4,367,107 1/1983 Valimont et al. ............. 156/364 X

Primary Examiner—David Simmons
Attorney, Agent, or Firm—Oblon, Fisher, Spivak, McClelland & Maier

[57] ABSTRACT

Two rigid sheets are centered separately in horizontal positions which are separated with regard to height, the centering being carried out relative to the same vertical plane of symmetry taken as a reference plane. The lower sheet is centered directly in the required position for stacking, and then after the deposition of the intermediate sheet the upper sheet is brought into its stacked position by a horizontal translation and a vertical translation of predetermined length corresponding to the distance separating the two positions of centering.

14 Claims, 3 Drawing Sheets

METHOD AND DEVICE FOR AUTOMATIC ASSEMBLY OF LAMINATED PANES

BACKGRONND OF THE INVENTION

1. Field of the Invention

The present invention relates to manufacture of stratified structures such as laminated panes and in particular to manufacture of curved laminated panes.

2. Background of the Related Art

Laminated panes used in transport vehicles, notably as a windscreen, are generally formed of at least one rigid sheet such as a sheet of glass or a sheet of plastic material such as polycarbonate or polymethylmethacrylate, and at least one sheet of plastic material which is more flexible, of polyvinylbutyral or polyurethane for example, generally used as an intermediate sheet in the case of a structure comprising two rigid sheets.

To manufacture laminated panes, the sheet or sheets of flexible plastic material are first of all cut out to the exact shape of the pane or to a shape which is geometrically slightly larger which is known as a blank, they are stacked with the other elements forming the laminated pane and all the elements are assembled together in an assembly operation which is generally carried out in two stages: a first stage consisting, for example, of a calendering operation providing preliminary assembly, followed by a second stage consisting of an autoclave cycle using temperature and pressure to provide the final assembly.

The invention relates more especially to stacking of the elements forming a laminated pane comprising two rigid sheets and a flexible intermediate sheet and especially centering of the rigid sheets such as glass sheets in the correct position for stacking.

One of the problems encountered in manufacture of laminated panes is the correct positioning in the stack of each of the elements forming said stack and notably the rigid sheets such as the glass sheets. In fact, stacking of the different elements has to be carried out to the nearest millimeter and this is not easy to obtain to the necessary precision on a manufacturing line for laminated panes operating at a high rate.

Automatic assembly lines for the elements of laminated panes have already been described, for example in European Patent Publication No. 0071109. However, these known lines are not entirely satisfactory, notably as regards the stacking.

SUMMARY OF THE INVENTION

The present invention provides a method and autoaatic device for stacking of the elements of laminated panes comprising two rigid curved sheets such as glass sheets and a flexible intermediate sheet such as a sheet of polyvinylbutyral or of polyurethane.

The method according to the invention consists of separately centering the two rigid sheets in horizontal positions which are separated from each other with respect to height and also longitudinally, the centering being carried out with reference to the same vertical plane of symmetry taken as the reference plane, the lower sheet being centered directly in its stacking position and then, after the intermediate sheet has been deposited on the lower sheet, the upper sheet being deposited in its stacking position by subjecting it to a horizontal translation and a vertical translation of predetermined lengths, corresponding to the distance separating the two centering positions.

According to a characteristic of the method, the reference plane of symmetry for the centering of the two rigid sheets is the plane of symmetry of the conveyor bringing the rigid sheets to the automatic assembly device.

The centering according to the invention is advantageously carried out while the two rigid sheets are arranged with their principal, that is to say the greatest, concavity oriented downwardly.

Even though the invention is applicable to other rigid sheets and other intermediate sheets, the description which follows will relate to automatic assembly of two sheets of curved glass and an intermediate sheet of polyvinylbutyral.

The automatic device according to the invention comprises means for centering the lower sheet in a horizontal position, these means being arranged at a stacking station, further means for gripping and centering of the upper sheet in a horizontal position, means for depositing the intermediate sheet in the stack, means for putting the upper sheet in place in the stack, and a conveyor transporting the glass sheets for their assembly, all these means being controlled by an electronic computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
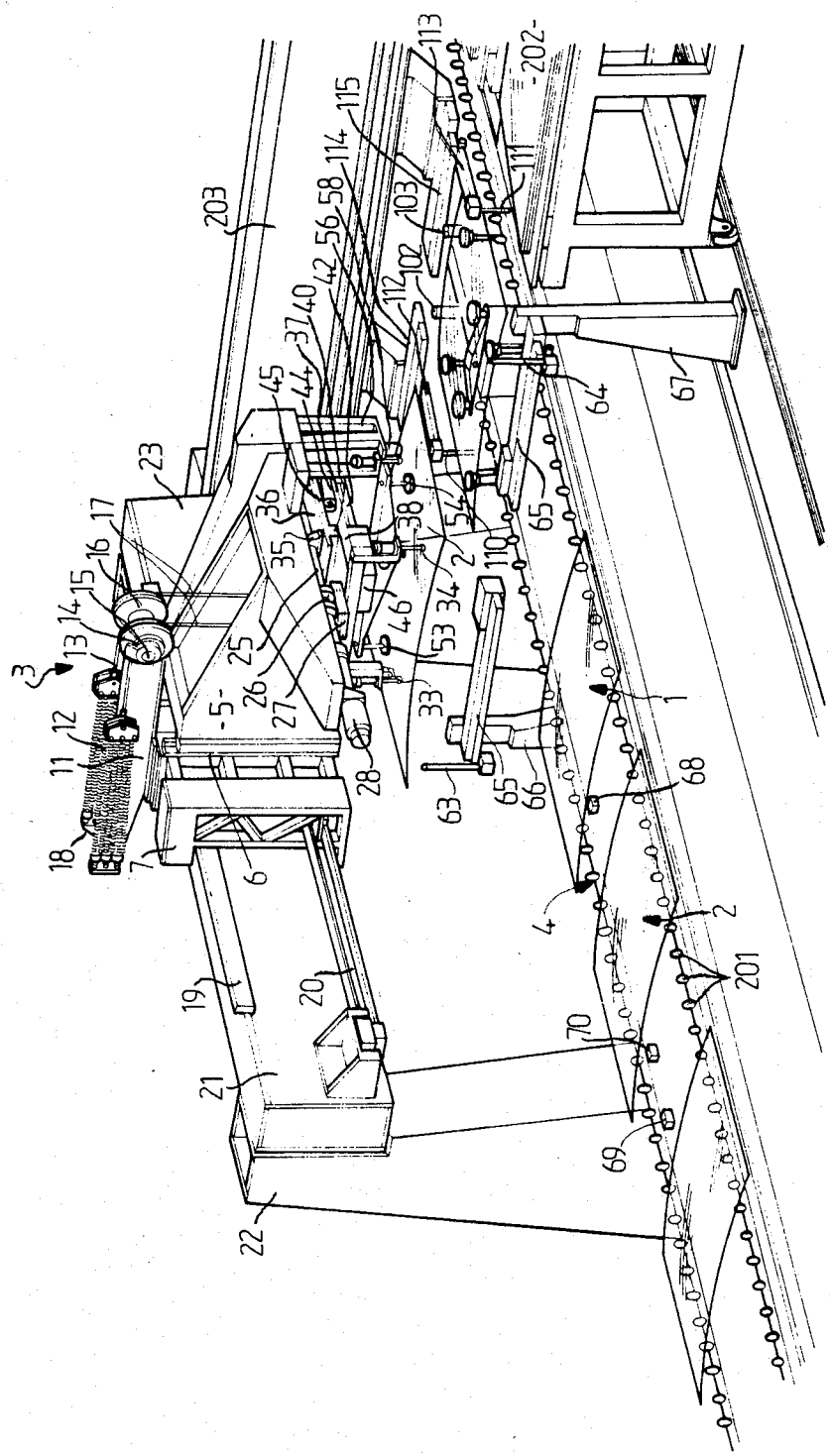
FIG. 1 is a perspective view of a device according to the invention for centering and stacking elements of a laminated pane.
Figure 2:
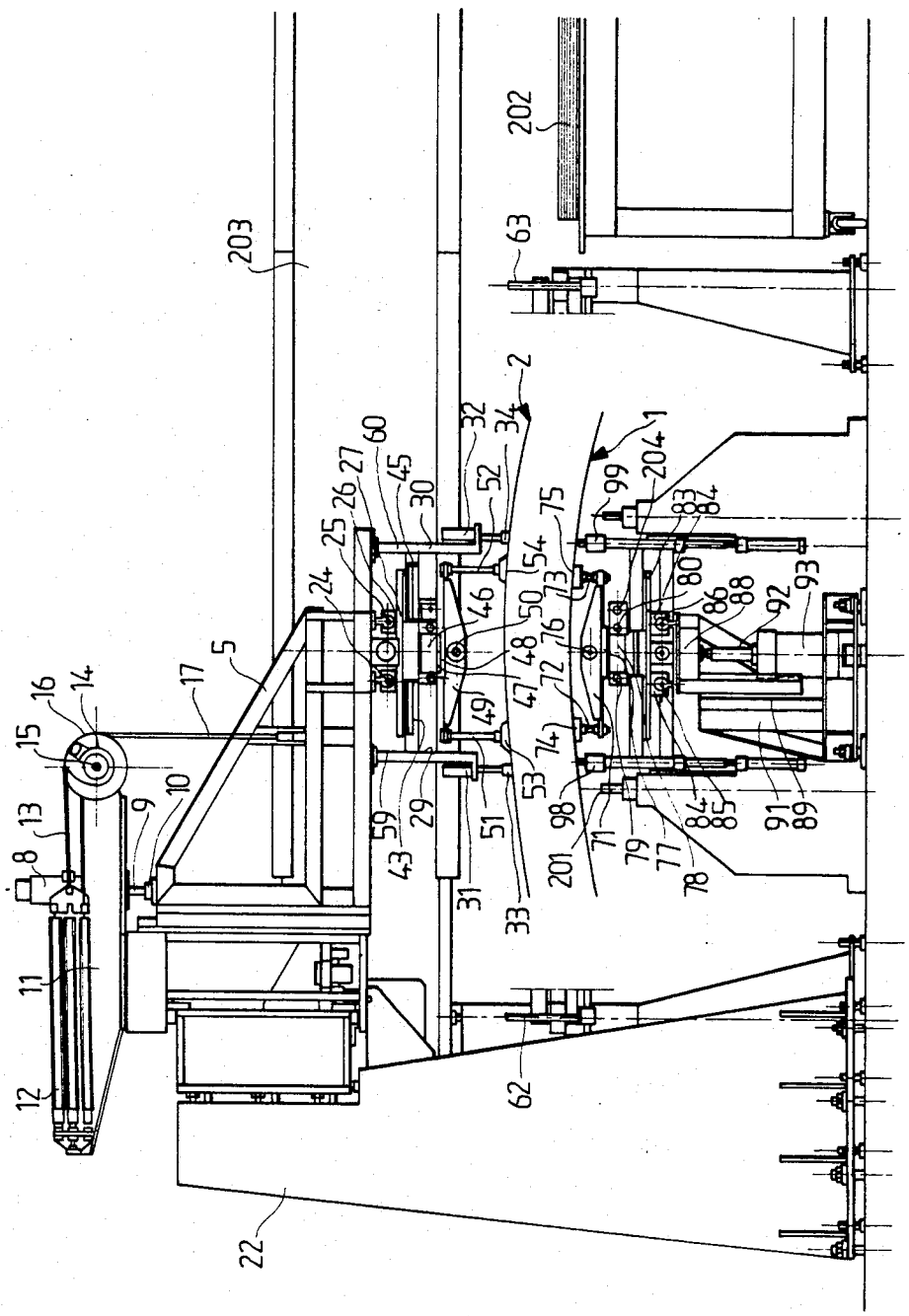
FIG. 2 is a view along the axis of the conveyor of the device shown in FIG. 1.
Figure 3:
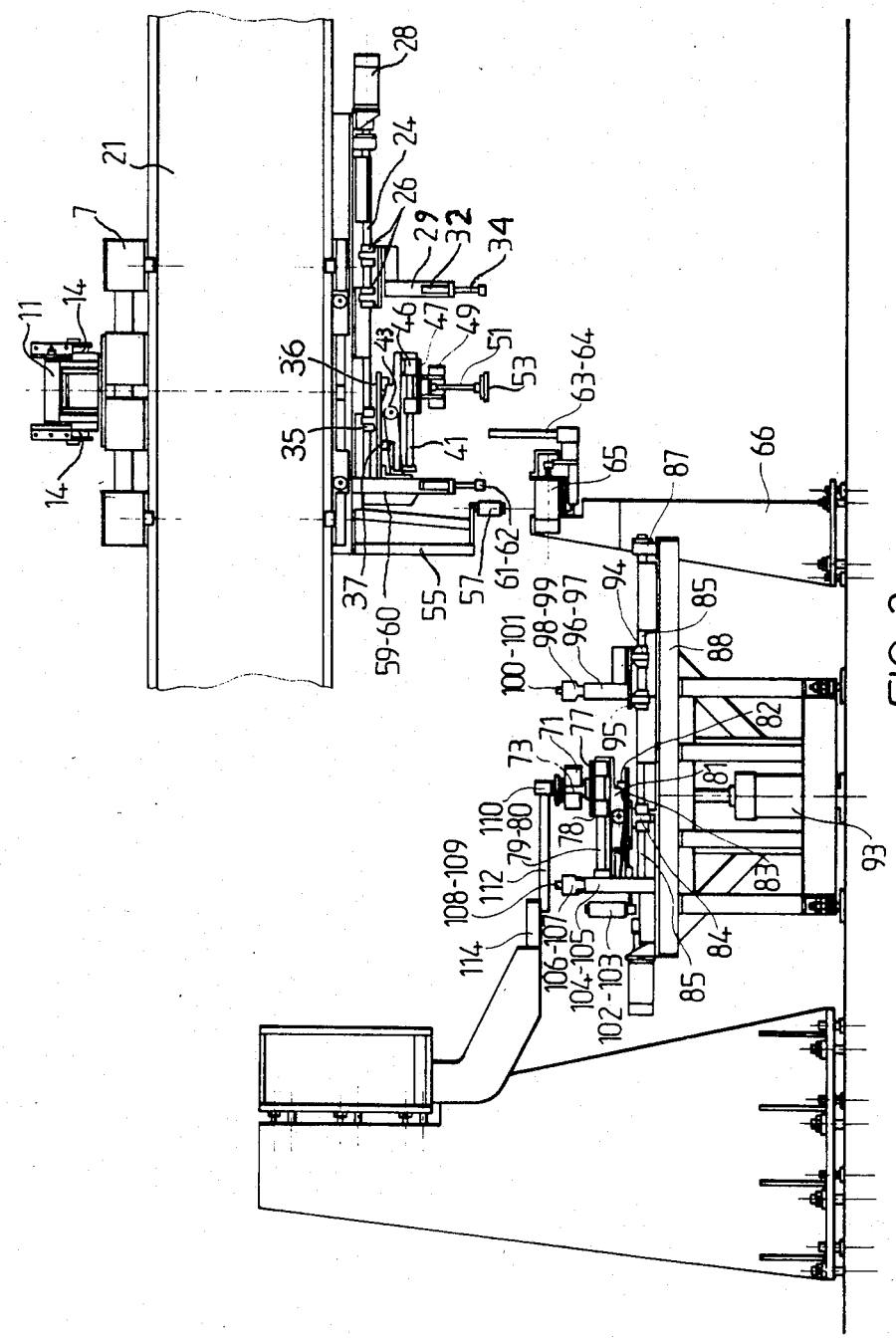
FIG. 3 is a view from the side of the device shown in FIG. 2.

In FIG. 1 there is shown the whole of the device for centering the two glass sheets 1, 2 and for stacking of the laminated structure. The means for gripping and centering 3 for the upper sheet are arranged above the conveyor 4 transporting the glass sheets and upstream of the stacking position. The conveyor 4 is formed essentially of two parallel belts carrying lugs 201, supporting the glass sheets. The centering means 3 are mounted on a gantry 5 which may slide on two vertical slides 6 carried by a carriage 7. This mounting gives a possibility of an up and down movement to the centering maans. This movement is controlled by a numericallv controlled motor 8 driving in rotation a vertical screw 9 through a nut 10 joined to the gantry as shown in FIGS. 2 and 3. The motor is mounted on a double beam 11 carried by the carriage 7. The weight of the vertically movable part of the device for gripping and centering the upper sheet is compensated by the force of a plurality of horizontal springs 12 of which the movable ends are fixed to two cables 13 wound around two eccentric pulleys 14 carried by a common horizontal shaft 15 mounted at the end of the double transverse beam 11.

These eccentric pulleys 14 which compensate for variations of the force of springs 12 associated with their elongation are joined in rotation to two other pulleys 16 rotating about the same shaft. On these pulleys are wound two vertical chains 17 of which the ends are fixed to a transverse member of the gantry.

The opposed ends of the compensation springs are fixed to a vertical plate 18 mounted at the rear end of the double beam. This mounting allows compensation for the weight of the gripping device at all points in its upwards and downwards path of motion.

The carriage may be displaced along two horizontal rails 19, 20 carried by a horizontal beam 21 arranged parallel to conveyor 4 in the assembly line where stacking of the elements forming the laminated pane is carried out. The carriage 7 carries out transfer of the upper glass sheet 2 from the point where it is seized by the gripping means on the conveyor at the stacking station. The horizontal beam 21 is supported by two pillars 22, 23.

Two horizontal shafts 24, 25 connected to the gantry are arranged below the latter parallel to the axis of the conveyor. On these two shafts slide four first bearings 26 mounted on a horizontal plate 27.

The sliding of the bearings along shafts 24, 25 is caused by a linear motor 28 fixed on the lower surface of the gantry and which drives a screw (not shown) parallel to shafts 24, 25 in rotation through a nut (not shown) connected to plate 27 and situated between the bearings 26. This horizontal plate 27 supports two symmetrical arms 29, 30 which are spaced transversely relative to the axis of the conveyor. At the end of each of the two arms 29, 30 is mounted a vertical jack 31, 32 having rods at whose ends are formed fingers 33, 34 for mounting the glass sheet in position in a horizontal plane for its later centering as described below. Sliding of the bearings 26 along the two shafts 24, 25 allows modification of the separation of the fingers 33, 34 relative to two downstream fingers 61 and 62 whose horizontal position is constant relative to the gantry 5 as described below.

Two other bearings 35 disposed downstream of the four first bearings 26 are also mounted to slide on the two horizontal shafts 24, 25. The bases of the two bearings 35 are fixed on a plate 36. On the lower surface of this plate there are arranged at their two ends two slides 37 extending transverse to the axis of the conveyor. On these slides there slides a sliding member 38 carrying two vertical plates 39, 40 connected to each other by two horizontal shafts 41, 42 arranged parallel to the axis of the conveyor.

The axis of slide member 38 is provided with a nut to which is screwed a screw 43 whose rotation causes the slide member to move in translation along the slides 37. The screw 43 is driven in rotation by a linear motor, which is not shown, by means of a toothed belt 44 engaging a pinion 45 mounted at the end of screw 43. On the two shafts 41, 42 slides a turret 46 provided with a rotating plate 47 arranged below its lower surface. On the vertical axis 48 of the plate 47 is mounted a balance arm 49 which extends transverse to the axis of the conveyor and pivots about a horizontal axis 50 parallel to the axis of the conveyor.

At each end of the balance arm 49 is fixed a vertical rod 51, 52 at the end of which is mounted a suction member 53, 54 serving for gripping of the glass sheets 2.

Two arms 55, 56 mounted on the downstream part of the gantry carry at their end the rods 57, 58 which have the function longitudinal of abutments for centering the upper glass sheet 1 in the direction the axis of conveyor 4. Two other arms 59, 60 mounted just upstream of arms 55, 56 carry at their end a vertical jack whose rod forms a finger 61, 62 for mounting in position of the glass sheet in a horizontal plane. These two fingers and also the two fingers 34, 35 described above and mounted further upstream are actuated simultaneously as described below.

On either side of the conveyor 4 are provided two centering members 63, 64 used for lateral centering of the upper glass sheet relative to the axis of the conveyor, these centering members being formed essentially of a vertical rod.

These centering members are mounted on two parts of a horizontal rail 65 arranged transversely relative to the conveyor and carried by the pillars 66, 67 at a sufficient height not to obstruct the lower passage of the glass sheets 1 on the conveyor. These centering members are driven by an electric motor controlled by the electronic computer of the assembly line.

Upstream of the centering members for the upper sheet and below the passage of the glass sheets carried by the conveyor 4 a photoelectric cell 68 detects passage of the glass sheet to be seized for the centering operation. Two other cells 69, 70 arranged further upstream determine the speed of the glass sheet to be seized. Determination of the speed and detection of the glass sheet allow gripping of a moving glass sheet by the gripping device, and centering of the upper sheet by the gripping device which is driven at a speed equal to that of the conveyor.

The centering and gripping device of the upper sheet described above allows, owing to the different movements of the balance arm 49 carrying the suction members for gripping, a correct mounting in position of the upper glass sheet. This correct position is according to the invention an intermediate position spaced from the stacking position by a horizontal translation and a vertical translation which are predetermined. This intermediate position is, according to the invention, centered on the axis of the conveyor. The centering also includes mounting the upper sheet in a horizontal position.

The centering means for the lower sheet 1 are arranged at the stacking station. These means are essentially similar to the centering means for the upper sheet. These means comprise a balance arm 71 arranged transversely to the conveyor 4. At the two ends of this balance arm are fixed two vertical rods 72, 73. At the upper ends of these two rods are mounted two suction members 74, 75 serving for gripping of the lower glass sheet. The balance arm 71 may pivot about a horizontal axis 76 parallel to the axis of the conveyor. The balance arm is also mounted on a plate 77 rotating about a vertical axis.

The plate 77 is mounted on a turret 78 sliding along two horizontal shafts 79, 80 arranged parallel to the axis of the conveyor. These two shafts are supported by a slider 81 which slides on two slides 82 extending transversely to the axis of the conveyor.

As previously described in the case of the device for centering the upper sheet, but not shown in the figures, the axis of the slider 81 is provided with a nut in which there is screwed a screw whose rotation causes displacement of the slider 81 along the slide members 82. The screw is driven in rotation by a linear motor through a toothed belt which engages a pinion mounted at the end of the screw.

The two slide members 82 are fixed to a horizontal plate 83 which is connected above two bearings 84 mounted to slide on two horizontal shafts 85, 86 parallel to the conveyor, and which are mounted by means of bearings 87 on a plate 88. This plate 88 is mounted to slide on two vertical slides 89 connected to a frame 91. Below the plate 88 is fixed to rod 92 of a vertical jack 93 for giving an up and down movement to plate 88 and thus to the device for gripping and centering of the glass sheet.

Four other bearings 94 are also mounted on the two shafts 85, 86 upstream of the two bearings 84. They carry a horizontal plate 95 which supports two symmetrical arms 96, 97 which are mutually spaced transverse to the axis of the conveyor. At the end of each of these arms is mounted a vertical jack 98, 99 whose rod forms a finger 100, 101 for mounting the glass sheet in position in a horizontal plane.

Downstream of the balance 71 arm and the suction members 74, 75 the device comprises two retractable vertical rods 102, 103 serving as abutment members in the longitudinal direction for centering of the lower glass sheet 1.

Two other arms 104, 105 arranged just upstream of rods 102, 103 carry at their ends vertical jacks 106, 107 whose rods form fingers 108, 109 for mounting the lower glass sheet in a horizontal plane.

The device further comprises two lateral centering members 110, 111 used for lateral centering of the lower glass sheet relative to the axis of the conveyor. These centering members, formed essentially of vertical rods, are mounted at the ends of arms 112, 113 which may be displaced along the two rails 114, 115 arranged above the passage of the glass sheets and carried by a beam 203 placed transversely to conveyor 4.

The device is operated and controlled by an electronic computer and functions in the following manner.

The first glass sheet 1 which is delivered by the conveyor 4 is the lower sheet of the stack to be formed. The sheet is arranged on the conveyor with its principal concavity directed downwardly. The detector placed below the conveyor detects its passage and causes actuation of the lower device for gripping and centering. The plate 88 is lifted along slides 89, 90 by the action of jack 93, and the suction members 74, 75 seize the glass sheet 1. The movable upper part of the device is displaced along the horizontal shafts 85, 86 to bring the glass sheet 1 into abutment against the two forward rods 102, 103. The balance arm may at this moment pivot slightly about its vertical axis through the rotating plate 77. The four jacks carrying fingers 100, 101, 108, 109 are then actuated to bring the glass sheet into a horizontal position. The balance arm may at that moment pivot slightly about its horizontal axis 76. The two lateral centering members 110, 111 are then brought into play. These centering members measure from a given position the distance travelled by them to arrive in contact with the edges of sheet 1. A message is then sent to the electronic computer which controls movement of the slider 81 along the slides 82 by means of the screw. Centering is thus carried out relative to the vertical axial plane of the conveyor, as the slider 81 displaces the glass sheet 1 to center it in the axial plane. The balance arm may at this moment pivot slightly about its horizontal axis 76.

During this time the following sheet 2 forming the upper element of the assembly brought by the conveyor, its principal concavity also directed downwardly, is seized by the upper gripping and centering device while the sheet 2 is moving. Detection of the speed of the sheet to be seized is carried out by two successive cells 69, 70 and the information is sent to the electronic computer which will control the movement of advance of the gripping device.

The downstream cell 68 detects passage of the sheet 2.

Seizing of the sheet 2 is carried out by lowering the gripping device which slides along the slides 6 carried by the carriage 5. The suction members 53, 54 arrive in contact with the glass sheet which is thus seized while moving and lifted. The linear motor 28 driving the screw (not shown) in rotation is actuated and by horizontal sliding of the bearings 26 along the shafts 24, 25 the sheet 2 is brought into abutment against the two rods 57, 58 for longitudinal centering. The balance arm 49 may at this moment pivot slightly about its vertical axis by means of the rotatable plate 47. The four jacks carrying the four fingers 33, 34, 61, 62 are then actuated for mounting fingers 33, 34, 61, 62 are then actuated for mounting the glass sheet in its horizontal position. The balance arm may at this moment pivot about its horizontal axis 50. The two lateral centering members 63, 64 are then actuated. As for the lower glass sheet the lateral centering members measure from a given position the distance travelled by them along the transverse rail 65 to arrive in contact with the edges of the sheet. Upon this contact a message is sent to the electronic computer which controls transverse displacement of the slider 38 along the slides 37 by action of the screw 43 to bring the glass sheet into a symmetrical position relative to the axial plane of the conveyor taken as a reference. The balance arm may at this moment pivot about its horizontal axis 50.

While the two glass sheets are adjusted in their correct positions at separate emplacements for stacking, an associated device (not shown) for gripping and transfer of the intermediate sheet 202 seizes this sheet waiting at an adjacent station and assures its transfer to the stacking station by displacement along the beam 203.

Deposition of intermediate sheet 202 is carried out on the lower glass sheet which has previously been centered as described above.

After removal of this associated device the upper glass sheet 2 previously centered relative to the axial plane of the conveyor as described above is brought onto the stack by translation of the carriage 7 and a descent of the gantry 5.

One of the advantages of the device according to the invention is that it allows simultaneous manufacture of several types of laminated panes owing to the multiple possibilities of displacement of the centering members and the balance arms.

Thus the separation of the two fingers 33, 34 arranged upstream (front fingers) relative to the two fingers 61, 62 arranged downstream (rear fingers) may be modified by the action of motor 28 by sliding along the shafts 24, 25 of the four bearings 26 carried by the plate 27 with regard to the upper centering device. The separation of the balance arm 49 carrying the suction members for gripping of the glass sheet, relative to the two pairs of fingers may be modified by the action of a motor, which is not shown, by a sliding of the turret 46 along the two longitudinal shaft 41, 42. Thus it is always possible to arrange the balance arm forward and aft in the middle of the fingers.

Likewise, the separation of the two fingers 100, 101 arranged upstream (front fingers) relative to the two fingers 108, 109 arranged downstream (rear fingers) may be modified by the action of motor 85 by sliding along the shafts 85, 86 of the four bearings 88 carrying the plate 83 in the case of the lower centering device. The separation of balance arm 71 may for its part be modified by sliding of the turret 78 along the two shafts 79, 80, this movement being caused by operation of a screw 204 arranged parallel to shafts 79, 80 and controlled by a linear motor which is not shown.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of centering and stacking elements of a laminated pane during automatic assembly of said panes, comprising the steps of:
   separately centering two rigid sheets in horizontal positions which are separated from each other with respect to height and also longitudinally, the centering being carried out with reference to a signle vertical plane of symmetry taken as a reference plane, the lower sheet being directly centered in a stacking position,
   positioning a flexible intermediate sheet on the centered lower sheet,
   depositing the upper sheet in the stacking position by subjecting said upper sheet to a horizontal translation and a vertical translation of predetermined lengths, corresponding to the distance separating the two centering positions.

2. The method of claim 1, wherein said rigid sheet is formed of glass and said intermediate sheet is formed from one of the group consisting of polyvinylbutyral and polyurethane.

3. The method of claim 1, including the steps of:
   using a conveyor to deliver said rigid sheets to a position where said centering steps are carried out; and
   aligning said rigid sheets in a conveying direction of said conveyor prior to said depositing step,
   wherein said vertical plane is the longitudinal plane of symmetry of said conveyor.

4. The method of claim 2, including the steps of:
   using a conveyor to deliver said rigid sheets to a position where said centering steps are carried out; and
   aligning said rigid sheets in a conveying direction of said conveyor prior to said depositing step,
   wherein said vertical plane is the longitudinal plane of symmetry of said conveyor.

5. The method of claim 1, wherein said rigid sheets have a principal concavity directed downward during said centering steps.

6. The method of claim 2, wherein said rigid sheets have a principal concavity directed downward during said centering steps.

7. The method of claim 3, wherein said rigid sheets have a principal concavity directed downward during said centering steps.

8. An automatic device for centering and stacking sheets of a laminated pane, comprising:
   conveyor means for transporting rigid and substantially horizontally oriented sheets in a conveying direction;
   first means for centering a lower one of said rigid sheets with respect to a vertical plane;
   means for positioning a flexible intermediate sheet on said centered lower sheet;
   second means for gripping and centering an upper one of said rigid sheets relative to said vertical plane and above said intermediate sheet;
   means for lowering said upper sheet onto said intermediate sheet to assemble a laminated pane; and
   control means for controlling said first and second means for centering for movement of said upper rigid sheet in a horizontal translation and a vertical translation independently of said lower rigid sheet.

9. The device of claim 8, wherein said first and second means for centering each comprise:
   a balance arm extending transverse to said conveying direction;
   means on said balance arm for holding a rigid sheet;
   a balance arm pivot axis on which said balance arm is pivotally mounted, said pivot axis extending parallel to said conveying direction; and
   means for selectively moving said pivot axis in three dimensions.

10. The device of claim 9, wherein said first and second means for centering each further comprise:
    two pairs of finger means for supporting a rigid sheet, said pairs of finger means being mutually spaced in said covveying direction, said balance arm being positioned between said pairs of finger means; and
    means for moving said balance arm in said conveying direction and relative to said pairs of finger means.

11. The device of claim 10 including means for modifying the mutual spacing of said pairs of finger means.

12. The device of claim 9, wherein said means for moving said axis in three dimensions include at least one numerically controlled motor controlled by said control means and a drive screw driven by each of said motors.

13. The device of claim 8 including means for aligning said rigid sheets along said conveying direction.

14. The device of claim 9, wherein said means on said balance arm for holding a rigid sheet comprise suction means.

* * * * *

UNITED STATES PATENT AND TRADEMARK OFFICE
CERTIFICATE OF CORRECTION

PATENT NO. : 4,793,878
DATED : Dec. 27, 1988
INVENTOR(S) : Giorgio GUGLIELMETTI et al.

It is certified that error appears in the above-identified patent and that said Letters Patent is hereby corrected as shown below:

On the Title Page, Item [75]:

Please correct the inventors' names to read as follows:

-- Giorgio Guglielmetti --
-- Guido Carossio --
-- Luigi Gilli --

Signed and Sealed this

Twentieth Day of June, 1989

Attest:

DONALD J. QUIGG

Attesting Officer

Commissioner of Patents and Trademarks